June 21, 1966  F. H. BLAKE  3,256,557
MACHINE FOR FORMING SHAPED ARTICLES OF MEAT AND THE LIKE AND
FOR SUPPLYING PAPER SHEETS AND THE LIKE
Filed March 15, 1965  8 Sheets-Sheet 1

FIG. 1.

INVENTOR.
FREDERICK H. BLAKE
BY Schapp & Hatch
ATTORNEYS

June 21, 1966  F. H. BLAKE  3,256,557
MACHINE FOR FORMING SHAPED ARTICLES OF MEAT AND THE LIKE AND
FOR SUPPLYING PAPER SHEETS AND THE LIKE
Filed March 15, 1965  8 Sheets-Sheet 2

FIG. 2.

INVENTOR.
FREDERICK H. BLAKE
BY
Schapp & Hatch
ATTORNEYS

INVENTOR.
FREDERICK H. BLAKE
BY
Schapp & Hatch
ATTORNEYS

United States Patent Office 3,256,557
Patented June 21, 1966

3,256,557
MACHINE FOR FORMING SHAPED ARTICLES OF MEAT AND THE LIKE AND FOR SUPPLYING PAPER SHEETS AND THE LIKE
Frederick H. Blake, 841 Carnation Court, Los Altos, Calif.
Filed Mar. 15, 1965, Ser. No. 439,530
7 Claims. (Cl. 17—32)

This application is a continuation-in-part of co-pending application Serial No. 267,188, filed March 22, 1963, entitled, Machine for Forming Shaped Articles of Meat and the Like, now abandoned.

The present invention relates to improvements in a machine for forming shaped articles of meat and the like and for supplying paper sheets and the like, and more particularly it relates to an improved machine for forming hamburger patties of uniform shape and weight in a rapid automated operation.

A considerable number of machines have been designed for shaping hamburger patties, and these machines range from simple hand-operated molds to rather complicated mechanisms. However, certain problems have been encountered in providing automatic machinery in addition to the ever-present problems of increasing speed and accuracy of operation. The present invention is directed to a machine which not only increases the speed and accuracy of operation, but which is substantially fool-proof insofar as the prevention of failures of certain components is concerned.

Speed of operation is, of course, important in order to provide a large volume output for a given machine and thereby increase the production from a single capital investment. Increased speed is also important in minimizing the number of necessary machines to be utilized and the space occupied thereby.

Accuracy of operation is also of considerable economic importance because it is absolutely necessary to maintain the proper weight in order to positively insure that the customer receives the weight portion bargained for. It is, of course, possible to increase the size of the portion to a quantity sufficiently above the labelled weight which is sold to accommodate variations, but even a small increase above the basic weight results in a considerable loss in the number of articles obtained from a fixed supply. Since the molding operation is substantially volumetric in character, this accuracy can only be provided by metering the meat at a substantially constant pressure, which pressure is adjusted from time to time to control the weight of the patty at the desired value.

It is also important to provide fail-safe mechanisms whereby foreseeable failures can be automatically corrected by the operation of the machine and thereby avoid shutdowns and serious delays to production. In addition, it is advantageous to provide a machine which automatically presents the shaped meat in a form suitable for packaging and/or freezing by providing paper separators.

It is also a part of the present invention to provide an apparatus for supplying paper sheets and the like, which apparatus is programmed to function together with the machine for forming shaped articles of meat so that the meat and paper may be brought together to provide paper spacers between the shaped meat articles. Although the apparatus for supplying paper has been especially adapted for providing these paper separators, it will be appreciated that other utility may be obtained therefrom and that its general application is suitable any time it is desirable to provide paper sheets cut to a given size to a given location from a supply roll or the like.

The apparatus for supplying paper has also been provided with automatic operations and various fail-safe mechanisms so that all of the movements of the paper supply device are synchronized together and maximum performance is positively assured.

Accordingly, it is the primary object of this invention to provide an automated mechanism for forming shaped articles of meat and the like in which the various operating parts of the machine are synchronized together to minimize lag time and provide maximum speed of operation.

Another object of the invention is to provide a machine for forming shaped articles of meat and the like in which a substantially constant density product of meat is obtained in order to provide shaped articles having a minimum deviation of weight.

A further object of the invention is to provide a machine of the character described in which a series of sequential operations is carried on simultaneously so that the output of the machine is determined by the speed of the longest single step and a short time is required for this step.

Still another object of the invention is to provide a machine of the character described in which engaging parts are equipped with fail-safe mechanisms to prevent damage thereto in the event of any stoppage or breakdown of the machine.

Still another object of this invention is to provide a machine of the character described in which all of the operating steps are controlled through a single electrical control system providing a minimum of lag time while at the same time positively providing time for completion of all of the operational steps.

Yet another object of the invention is the provision of an apparatus for supplying paper in which the various operating parts are synchronized together by a fail-safe control system.

Further objects and advantages of my invention will be apparent as the specification progresses, and the new and useful features of my machine for forming shaped articles of meat and the like and for supplying paper sheets and the like will be fully defined in the claims attached hereto.

A preferred form of my invention is illustrated in the accompanying drawings, forming a part of this specification, in which.

While I have shown only the preferred forms of my invention, it should be understood that various changes or modifications may be made within the scope of the claims attached hereto without departing from the spirit of the invention.

Figure 1:
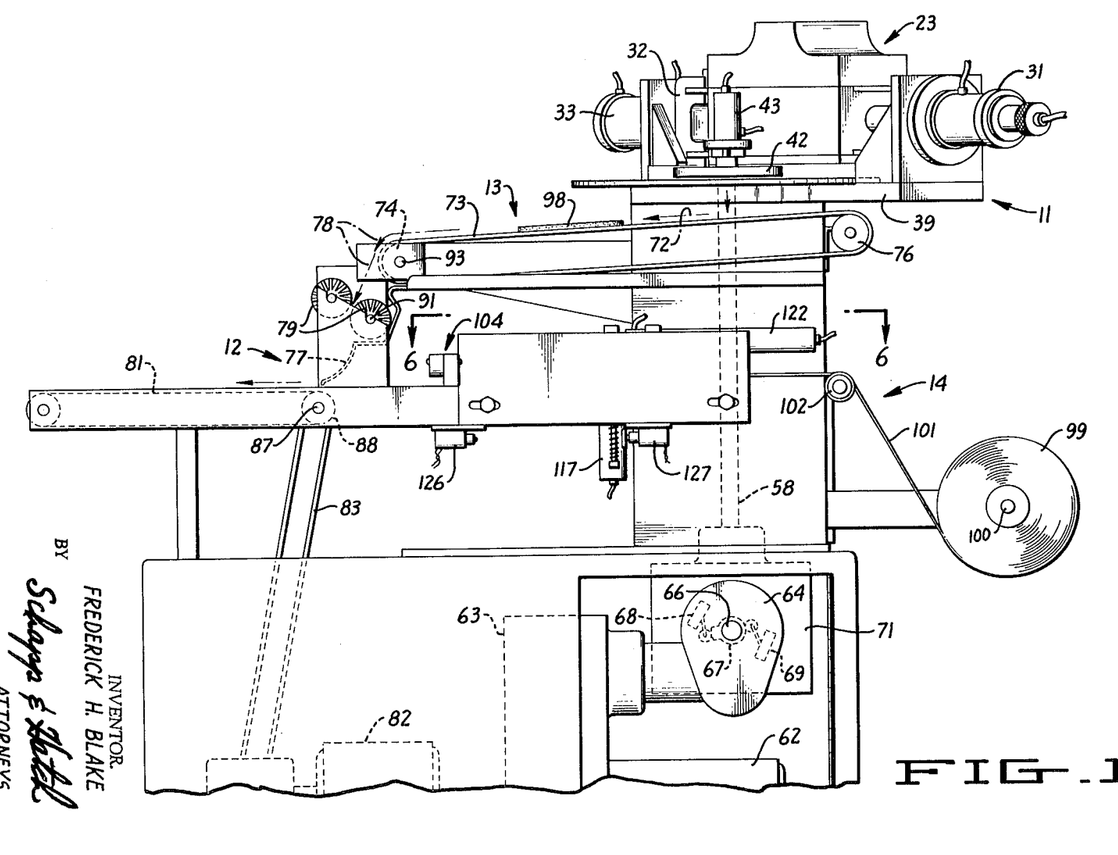
FIGURE 1 is an elevational view of the machine with part of the support thereof removed.

Referring to the drawings in greater detail, there is shown in FIGURE 1 a machine for forming shaped articles of meat and the like comprising a patty forming apparatus or section 11 in which the meat is formed into hamburger patties or similar shapes, a patty papering station 12 where the patties are cubed and provided with paper, a patty conveyer 13 for carrying the patties from the patty forming section to the patty cubing and papering station, and a paper supplier 14 for supplying paper to the patty papering station 12 in synchronized fashion whereby the patties are each placed on a piece of paper so that they may be stacked at a subsequent station with paper sheets disposed therebetween. The machine also contains various driving elements for supplying motive power to the various components of the machine together with control means for synchronizing this motive power and integrating the movements of the machine parts into a smoothly and efficiently operating unit.

Referring more particularly to the patty forming section 11 and FIGURES 1 through 4 of the drawing, there is shown a meat forming station 16 (see FIGURES 2 and 3) containing a mold 17 formed by a substantially flat plate 18 mounted for rotation about its center 19 and containing a plurality of substantially congruent openings or cavities 21 spaced evenly on the circumference of a circle having its center at 19. With this structure, successive openings are positioned sequentially at substantially the same position by rotation of the plate a fraction of a circle corresponding to the reciprocal of the number of openings evenly spaced therearound. The patty forming section 11 also comprises a meat removing station 22 which is located at one of the openings or cavities 21 while another opening or cavity 21 is positioned at the meat forming stations 16, and means 23 for supplying meat to the mold 17.

Since the patties are formed to a volume corresponding to the volume of the openings or recesses 21 of plate 18, it is important to provide a rather uniform density of meat to the mold in order to provide a substantially uniform weight. Thus, the means 23 is preferably constructed to provide a uniform amount of compactness to the meat as it is forced into the mold and formed therein. It is also important to provide a control that can be adjusted to make corrections, if necessary.

In other words, if the amount of weight of the metered volume of meat should vary because of the density inconsistency from one batch to the next, the total weight of meat in the metering cavity is varied by adjusting its stroke slightly to make up the difference. When the meat is driven into the mold, the change results in a different compaction or corrected density. In general, any meat supply device capable of providing meat at a substantially constant pressure may be used and pumps capable of performing this function are commercially available. However, the pumps now available, although operable, do not provide sufficient accuracy and I prefer to use the improved meat pump described and claimed in my co-pending United States patent application Serial No. 267,498, filed March 25, 1963, entitled supply system. The air pressure used is also adjustable to adjust the compactness of the meat delivered to the receiving chamber.

Figures 3, 4, 5:
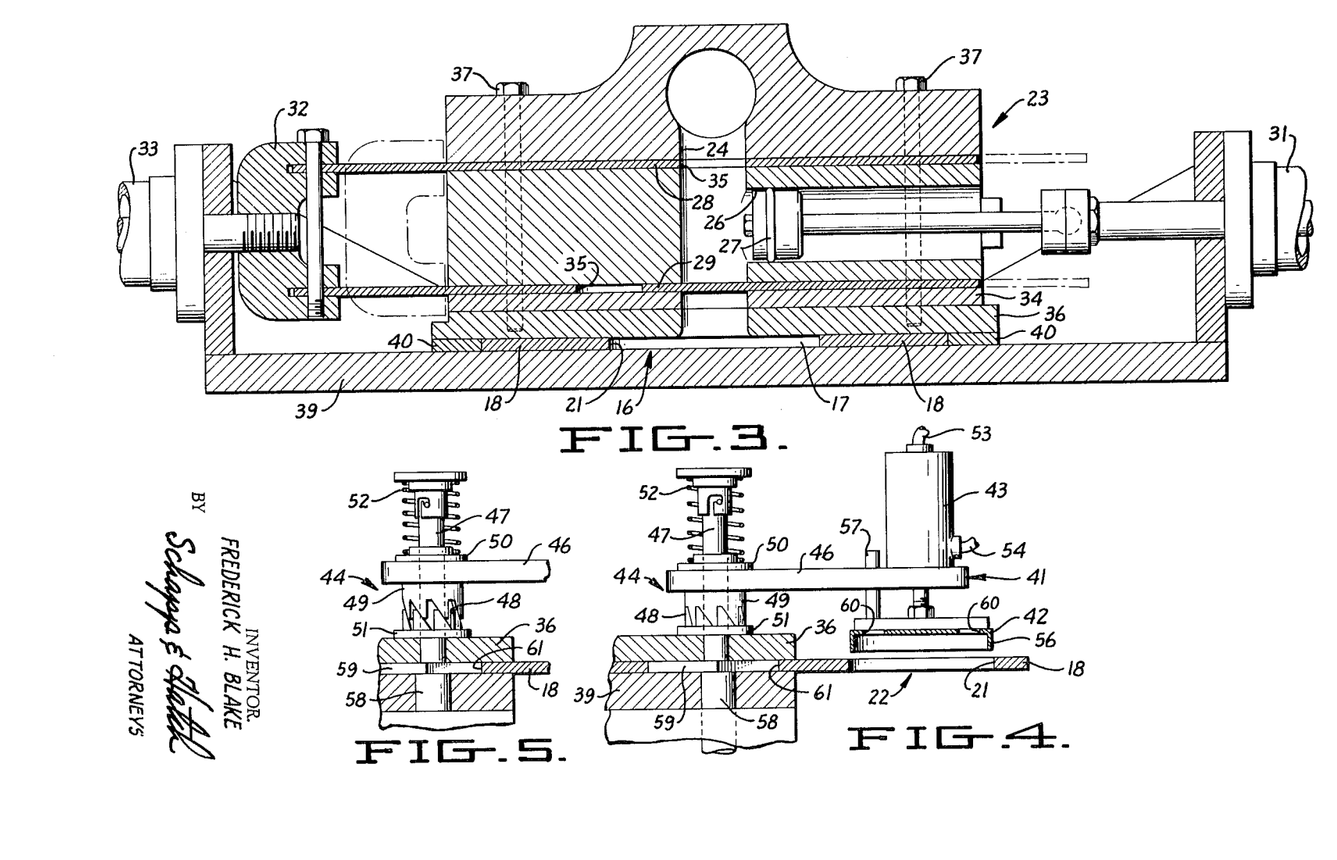
FIGURE 3, an enlarged cross-sectional view of a part of the machine taken in the plane of line 3—3 of FIGURE 2 illustrating in detail the mechanism for supplying meat to the mold of the machine.
FIGURE 4, an enlarged sectional view taken in the plane of line 4—4 of FIGURE 2 illustrating a knockout mechanism for removing shaped meat from the mold.
FIGURE 5, a view of a portion of the mechanism shown in FIGURE 4 illustrating the operation of a fail-safe mechanism included in this machine.

Referring more particularly to FIGURE 3, the preferred form of the invention includes a meat receiving chamber 26 in the form of a cylinder in communication with a manifold 24 in the meat supply line, and carrying a plunger 27 therein for providing the variable differential volume in said receiving chamber to correspond with the volume of the mold plus the amount of compaction described above. This receiving chamber is located between plate valves 28 and 29 which are positioned within the manifold in such as way that when valve 29 is closed and valve 28 is opened the receiving chamber is in communication with the means 23 for supplying meat and when valve 28 is closed and valve 29 is opened the receiving chamber is in communication with the mold 17. These valves are ganged together so that they operate between these two positions.

Plunger 27 is carried on a mechanism known under the trade name Variable Stroke, and the mechanism is capable of delivering material from the cylinder by movement of the plunger through operation of air cylinder 31. The length of movement of the plunger is adjustable to accommodate for various different mold sizes. In addition, the adjustment is utilized to correct for variations in the meat supply to correct changes in density of the meat and maintain a uniform weight output.

Plate valves 28 and 29 are supported for axial movement across the manifold by a common reciprocating member 32 and each plate valve consists of a substantially flat plate having openings 35 in staggered relation to each other. Thus, in the position shown in FIGURE 3, plate valve 29 is closed by having its plate extend across manifold 24 while plate valve 28 is open by having its opening 35 in registry with the manifold 24. However, when the reciprocating member 32 moves to the position shown in phantom in FIGURE 3, the valve 29 is open and has its opening 35 in registry with the manifold while valve 28 is closed. Thus, it is seen that the valves are positively connected together so that one valve only is open at the extreme position of the reciprocating member. Reciprocation is provided to this member and in turn to the valves by air cylinder 33.

Air cylinders 31 and 33 are conventional in construction and contain pistons moveable therein by virtue of differential air pressure supplied through appropriate hoses. However, air cylinder 31 is a variable stroke while air cylinder 33 is a constant stroke. These air cylinders are found to be particularly satisfactory in providing the desired quick movement and in minimizing malfunction of the machine. However, it will be appreciated that other means of effecting these movements may be provided if desired.

The various units mentioned above of the meat forming station are suitably fastened to the frame of the machine and with the exception of the relatively moveable parts already mentioned, the parts are held stationary. Thus, the manifold is held in a fixed position and communicates to the opening or cavity 21 of the flat plate 18 at the patty forming station through a spacer plate 34 and a shear plate 36 as best seen in FIGURE 3. The shear plate serves to hold the various units of the manifold together by means of bolts 37 and the shear plate is bolted to the frame by means of bolts 38. Spacer plate 34 is provided to accommodate various sizes of substantially flat plate members containing the mold cavities in the shape of its opening 21. In other words, the mold cavities may be varied in size by utilizing different plate members having different sized cavities. In order to provide a different thickness of mold plate, the spacer plate should have thicknesses of compensating differences so that the plate valves and meat receiving chamber may be held fixedly mounted to the frame for all sizes of molds. Ring plate 40 which fits adjacent to the mold plate should also be changed along with the mold plate to maintain matching thicknesses.

As indicated above, the molded patty conforms to the size of the openings in the flat plate and this is achieved by providing means in combination with the flat plate for holding meat within the plate. Thus, a table or bottom piece 39 having a substantially flat surface is located in juxtaposed relation to the flate plate 18 at the meat forming station 16 to provide a wall or bottom for the opening located at the meat forming station. This table or bottom piece is also held stationary so that as the substantially flat plate 18 rotates, the meat in the manifold 24 is sheared off by shear plate 36 and the thickness corresponding to that of the flat plate is provided in the opening thereof and carried to the meat removing station 22.

The table or bottom piece 39 terminates in a position somewhat short of the meat removing station 22 so that the meat may drop out of the plate or be forced therefrom at the meat removing station. As the meat is removed from the flat plate, it drops down onto conveyor 13 and the table 39 is constructed to overlay the edge of this conveyor so as to positively prevent the meat from dropping until it is in substantially the proper position on the table.

In general, the meat tends to stick into the cavity of the flat plate and must be removed therefrom at the meat removing station by a knockout unit 41 adapted to knock the meat out of the flat plate at the meat removing station. In this connection, it is seen that the use of a rotating flat plate having cavities therein for the mold has considerable advantages because the bottom and top surfaces of the shaped meat are open and very little mold surface is in contact with the meat at the meat removal station and this surface is substantially vertical. In this way, absolutely complete removal of the meat is effected by the knockout unit 41 and build-up of meat particles on the mold is positively prevented.

Basically, the knockout unit 41 comprises a knockout plate 42 mounted for reciprocating movement into and out of the opening or cavity 21 at the meat removing station, motive means 43 for providing this reciprocating motion to the knockout plate, and a fail-safe device 44 for positively insuring that the knockout plate 42 is disengaged from the opening or cavity 21 on further rotation of the flat plate 18.

As best seen in FIGURES 4 and 5, the knockout unit 41 is carried on an arm 46 which is mounted on one end thereof on a vertical shaft which is an extension of the shaft rotating plate 18. The arm is mounted on the shaft in such a way that rotational movement of the shaft 47 is resisted by the matching cam or gear surfaces 48. One of these surfaces is carried on the lower portion of a boss 49 which depends from arm 46 and the other surface is carried by a boss or fitting 51 carried on shear plate 36. The arm 46 is normally urged downward by spring 52 acting on a thrust washer 50 so as to positively position arm 46 with respect to the meat removing station. At the end of arm 46, knockout plate 42 is carried in reciprocating fashion and operated by motive means 43 such as an air cylinder as shown provided with suitable air hoses 53 and 54 for effecting the axial movement thereof.

Knockout plate 42 is constructed with a depending flange 56 adapted to fit snugly within the opening 21 defining the mold and is accurately aligned in such position by a post 57 which is attached to arm 46 and prevents rotation of the knockout plate. Knockout plate 42 also contains holes 60 in the top thereof to prevent retention of the shaped meat articles within the knockout member.

The operation of the fail-safe device 44 is illustrated in FIGURE 5 where it is shown how the arm 46 moves when the knockout plate sticks into the mold opening. In other words, when the knockout plate sticks in the mold so that air pressure through hose 54 does not force it upward and out of the mold, the arm 46 is caused to rotate along with shaft 47 when the substantially flat plate 18 is rotated. This rotation causes relative movement of the cam surfaces 48 on the bosses 49 and 51 as shown in FIGURE 5, and this in turn causes arm 46 to be forceably elevated against spring 47. This movement positively releases the knockout plate from the opening in which it is stuck. Once the knockout plate is cleared from the opening, air hose 54 operates to retract it to the desired position and the spring 52 forces arm 46 back downward into the proper position. During this downward movement, cam surface 48 causes rotation of arm 46 back to exactly its original position so that the unit is ready for the next knockout operation.

From the foregoing description, it is seen that the operation of the patty forming section is controlled entirely by movement of the substantially flat plate 18 and operation of the various air cylinders in the proper synchronized relation. In order to provide sufficient time for the mold to fill with meat, the substantially flat plate is held at rest or stationary a sufficient length of time for this operation to take place. After a sufficient time has elapsed, the substantially flat plate is advanced the fraction of a circle corresponding to the number of mold openings or, in the instant example, one-third of a revolution. This movement places the next opening in proper position at the meat receiving station and places the opening containing the meat just formed at the meat removing station.

With this arrangement, the meat removing step is conducted simultaneously with the meat forming, both operations being carried out when the plate is stationary. In general, any suitable drive system capable of providing this alternate rotational movement and halting period may be used, such as conventional Geneva drive systems. However, it is very important to provide a drive system which accurately positions the plate for proper operation of the mold and the knockout mechanism and it is also desirable to provide accurate control of the rotational movement and the meat supply in order to obtain rapid operation without danger of insufficient filling of the mold.

As best seen in FIGURE 4, the substantially flat plate 18 is rotatably mounted on drive shaft 58 so as to have exactly the same rotational motion imparted thereto as is imparted to shaft 58. This transfer of rotational movement may be effected by any conventional method such as a spline or keyway, but I prefer to use the square drivehead 59 on shaft 58 which is tightly fit within a square opening 61 of the flat plate member. In this way, the strain of starting and stopping is easily handled and accurate positioning of the flat plate is positively assured.

In order to provide the desired alternate rotational movement and dwell to the shaft 58, I prefer to utilize one of the precision index drives or indexing transfer mechanisms available on the market. For example, a suitable indexing machine is shown in the Catalog No. 161 of the Ferguson Machine Company, a division of Universal Match Corporation of St. Louis, Missouri, or the machine shown in the sales literature of Commercial Hammond Machine Company of Chicago, Illinois. Many other suitable components are available commercially and may be adapted for the present machine. Accordingly, the representation of the preferred drive is shown schematically in FIGURE 1 of the drawing.

As here shown, a ¾ horsepower D.C. motor 62 is utilized with the motor being rated at 1800 r.p.m. variable speed with dynamic braking. A reduction gear 63 having a 10:1 ratio reduces the shaft speed from the motor and gears 64 transmit the power into shaft 66. In this position, the motor output is three revolutions per second and the shaft carries a cam 67 adapted to activate microswitches 68 and 69 substantially as shown. Power from shaft 66 then passes through the intermittent gear 71 which provides a 180° dwell and 180° motion for each revolution of shaft 66 and has a reduced output of one-third. In other words, with each revolution of shaft 66, drive shaft 58 and the rotating flat plate carrying the molds advance exactly one-third of a revolution.

During this cycle both microswitches 68 and 69 are tripped, one being adapted to trip just after the dwell begins and the other microswitch closing at the end of the dwell. These microswitches are utilized to synchronize the operation of the meat valves for supplying meat to the mold and knockout unit during the dwell period or stationary period of the mold plate. These actions are synchronized through electrical control circuits and a typical example of such a circuit will be described more fully hereinafter.

From the foregoing description, it is seen that each one-third revolution or advance of the substantially flat mold plate provides one unit of production because both the meat forming operation and the meat removing operation of a prior formed patty occur substantially simultaneously. It is also seen that the formed meat is dropped from the meat removing station at a substantially uniform constant rate, and that these pieces of meat are substantially the same size, shape and weight.

In the embodiment shown, the formed meat is taken up by the conveyor 13 and moved as indicated by the arrows 72 toward the papering station 12. Conveyor 13 is preferably kept moving at a constant speed at all times during the operation of the machine so that the formed meat or hamburgers are delivered to the papering station in accordance with the same timed sequence that they are formed or removed from the forming machine. The conveyor 13 may any conventional type of conveyor and the form illustrated is quite satisfactory. As shown in FIGURE 1, the conveyor consists of an endless belt 73 carried between a drive roller 74 and an idler roller 76.

As the meat leaves the endless conveyor, it drops down a guided chute or the like 77 as indicated by arrows 78 and passes between a pair of cubing rollers 79 which contain a plurality of knife blades spaced for forming cubed surfaces on the meat. These rollers 79 are carried within the chute 77 so that the meat passes therebetween and moves on to the papering station 12. At the papering station 12, the hamburger or patty lands on a section of paper that has been provided from paper supplier 14 and pushes the paper out onto the conveyor 81. The conveyor 81 is also driven continuously and carries each formed meat or hamburger patty and the section of paper on which it rests toward the end for stacking in preparation for freezing and packaging, or for direct packing, if desired.

Figure 2:
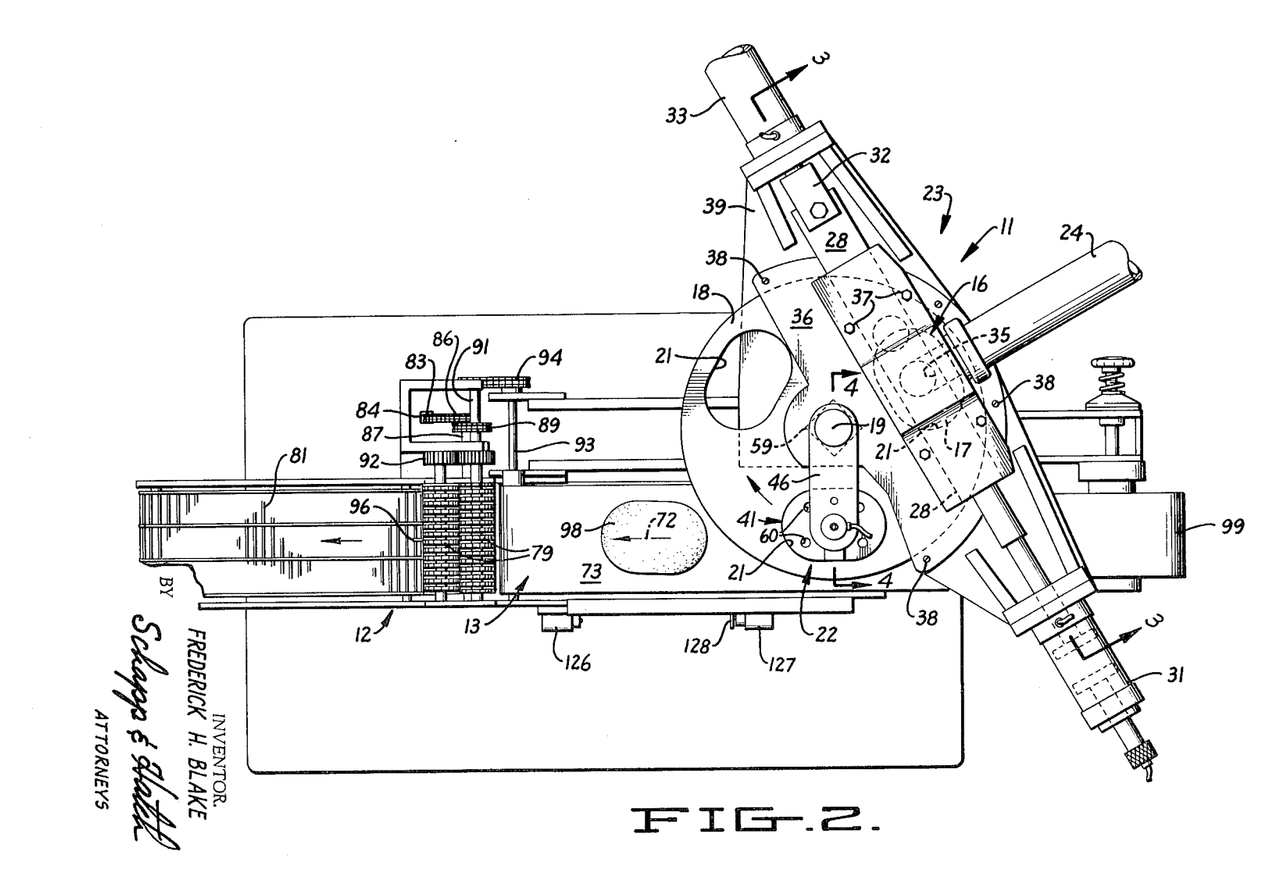
FIGURE 2, a plan view of the entire machine.

Any suitable drive means may be provided for the conveyor 81, conveyor 13 and cubing rollers 79. As shown in FIGURES 1 and 2, this drive is achieved from an electric motor 82 driving a belt 83 through a gear system and a pulley 84 which serves to transfer the power from the motor to the belt and reduce the speed thereof. Belt 83 then drives pulley 86 to drive conveyor 81 through shaft 87 and pulley 88, and this conveyor is also adapted to run continuously. Another drive pulley system 89 is provided to transmit power from shaft 87 to shaft 91. This shaft carries one of the cubing rollers 79 and provides continuous drive thereto while the other cubing roller 79 is geared to the driven cubing roller through gears 92 to cause opposed rotation thereof. The power from shaft 91 is also transferred to a shaft 93 by the drive pulley system 94, and this shaft 93 is keyed to drive roller 74 of conveyor 13. In this way, the conveyors 13 and 81 and the cubing rollers 79 operate when motor 82 operates. Thus, the control of the power to the motor serves to control the operation of these conveyors.

Figure 7:
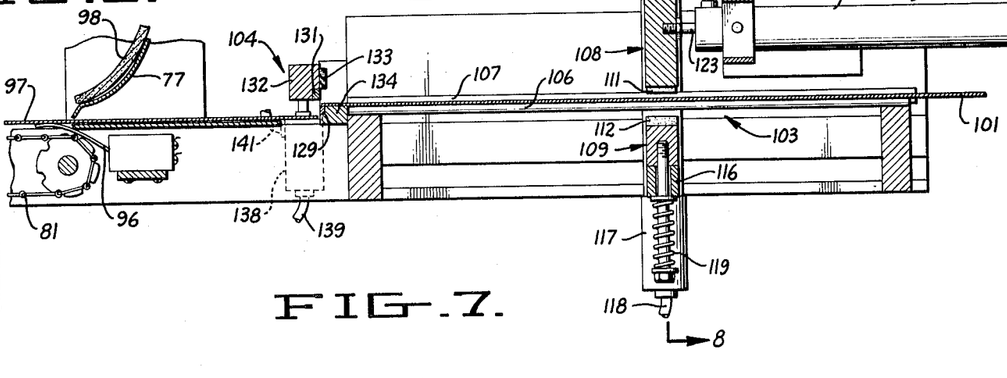
FIGURE 7, a cross-sectional view taken in the plane of line 7—7 of FIGURE 6.
Figure 13:
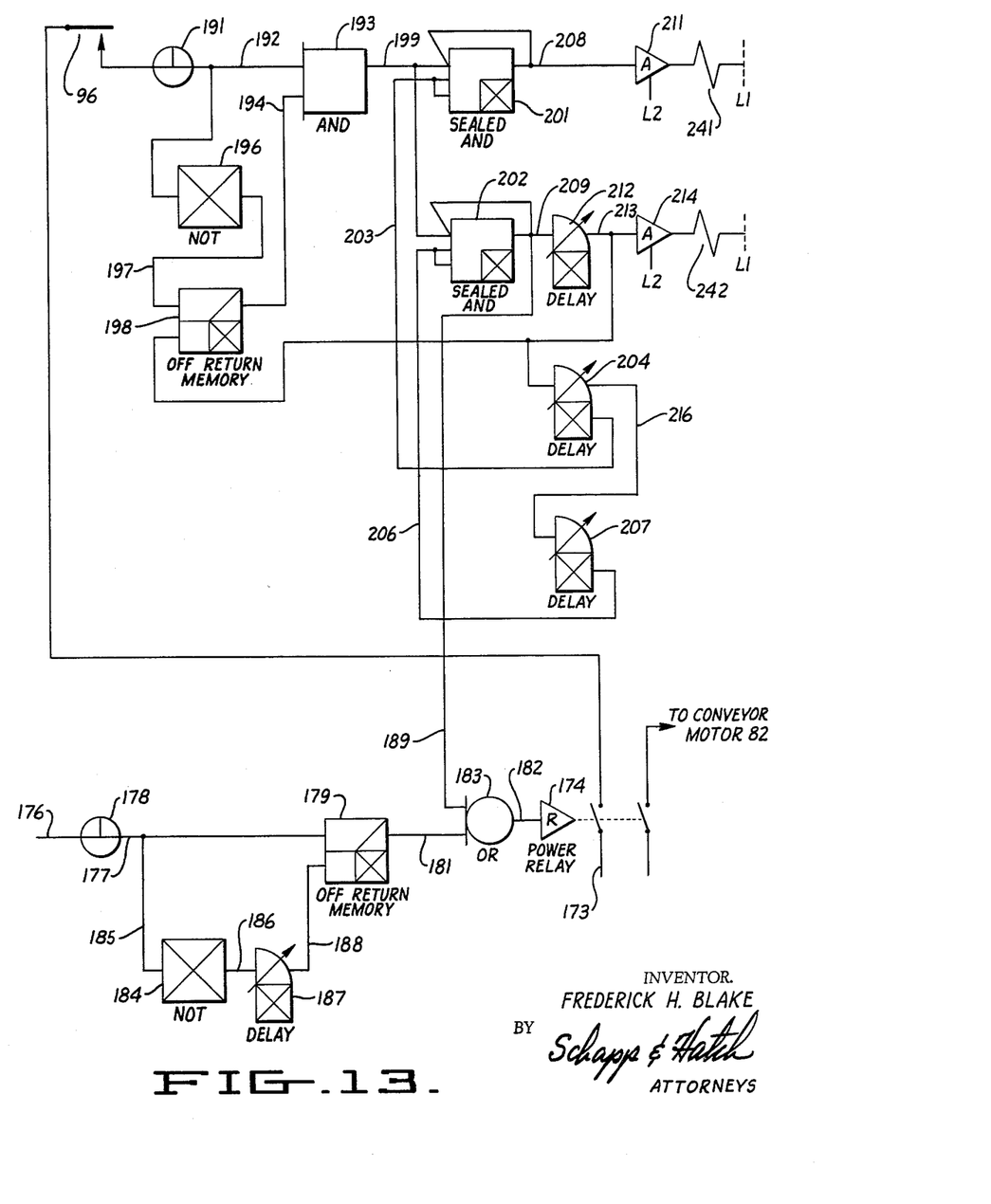
FIGURE 13, a diagrammatic view illustrating a typical control circuit for the paper supplier of this machine.
Figure 14:
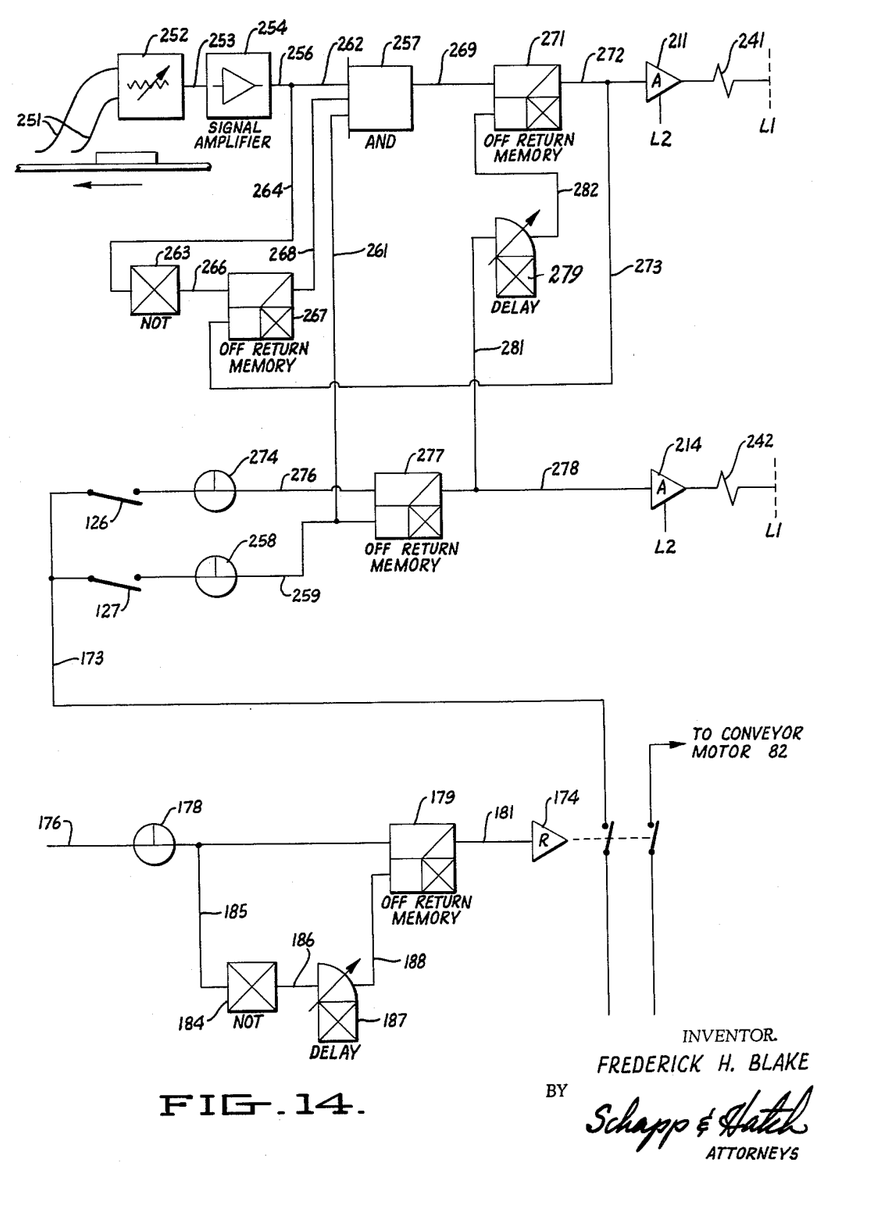
FIGURE 14, a diagrammatic view illustrating a preferred control circuit for the paper supplier of this invention.

In order to provide a piece of paper for each meat patty or hamburger, the paper supplier 14 is adapted to provide a piece of paper each time a microswitch 96 is tripped, as shown in the control system of FIGURE 13, or any other switch such as the resistance probes 251 used in the control system of FIGURE 14 is actuated. This microswitch or resistance probe is located at the end of chute 77 and is adapted to lie under a piece of paper 97 provided by the paper supplier in position to hold the meat patty. As best seen in FIGURE 7, a formed meat patty 98 comes down the chute 77 and lands on paper 97. As it lands on paper 97, it trips the microswitch 96 and pushes the paper downward to rest on conveyor 81. When conveyor 81 moves, it carries the paper 97 and meat patty 98 away from the station 12. When the paper and patty clear the microswitch 96, it is returned to the upward position and stays there until another meat patty drops from the chute and actuates it again.

Thus, the paper supplier is synchronized with the supply of patties through the microswitch and/or other suitable control means actuated thereby so that the paper supplier undergoes one cycle of operation each time the microswitch is tripped. This positively assures having one and only one piece of paper in position for each meat patty as it arrives at the station 12.

The paper supplier provides square pieces of paper from a roll of paper 99 which is mounted for free rotation on a suitable frame 100 which serves as means for holding a roll of paper, as shown in FIGURE 1. The roll of paper is already cut to the desired width so that it is only necessary to take the desired length of paper 101 from the roll and cut off this length. In operation, the paper is passed over the guide roller 102, which is mounted for free rotation, and the paper then lies flat on paper pusher 103. A cutter 104 is located at the end of the paper pusher opposite to the supply roll 99 and cuts off lengths of the band of paper 101 advanced by the pusher to form the paper squares 97 adapted to receive the meat patties 98.

In general, the operation of the paper pusher involves pushing the paper 101 a length sufficient to correspond with the length of the paper 97, and then operating cutter 104 to cut off this length. As each piece of paper 97 is cut, it is in position to receive a meat patty 98, and when the meat patty 98 lands on the piece of paper 97 its weight causes engagement with conveyor 81 and both the paper and patty are removed from the papering station 12. At the same time, the weight of the meat patty trips microswitch 95 to activate another cycle in the operation of the paper pusher. Thus, when the paper pusher 103 pushes another length of paper, station 12 is clear of the previous piece and ready to receive another section of paper.

The operation of the paper pusher and the cutter 104 are synchronized and the complete cycle is timed so as to be completed before the next meat patty is provided from the patty forming section. However, the internal cycle controls of the paper pusher timing system and control mechanism are otherwise independent from the patty forming section operation. Alternate supply of paper and meat patties to the papering section in exact synchronization is assured by utilizing the microswitch 96 or equivalent structure so that each cycle of operation of the paper pusher is positively dependent on the receipt of a meat patty from the meat forming section.

Figure 6:
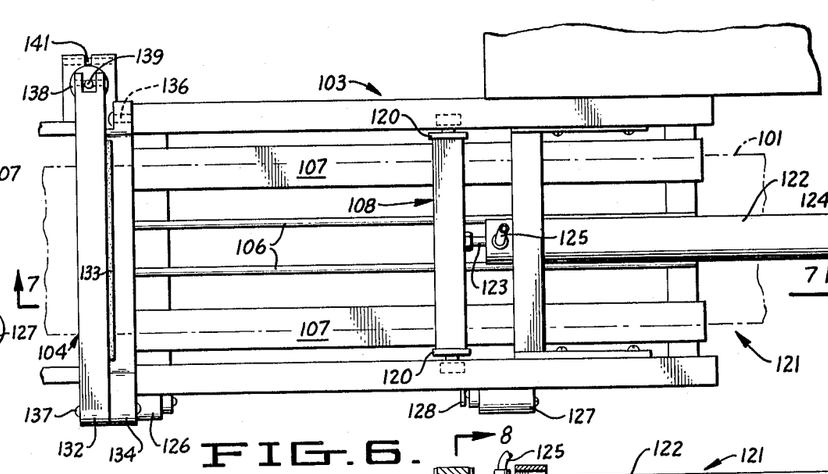
FIGURE 6, an enlarged top view taken in the plane of line 6—6 of FIGURE 1 illustrating in detail a portion of the apparatus for supplying paper sheets utilized in the machine of this invention.
Figure 8:
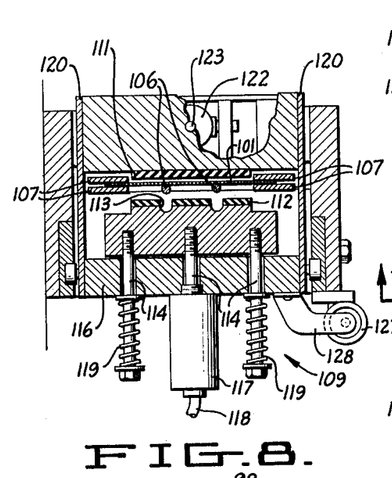
FIGURE 8, a cross-sectional view taken in the plane of line 8—8 of FIGURE 7.

The paper pusher 103 is carried on the main frame of the machine or, alternatively, it can be mounted in a separate frame, and contains stationary members in the form of rods 106 adapted to support the paper at the central portions thereof and guide plates 107 adapted to support and confine the edges of the paper band 101 as best seen in FIGURES 6 through 8. In addition, the paper pusher contains a carriage 108 which is mounted for reciprocating movement in a direction corresponding with the long axis of the band of paper and also contains a paper gripping mechanism 109 for gripping the paper when the carriage is in the retracted or back position so that the paper will move forward according to the forward movement of the carriage. The length of paper supplied is varied by adjustment of the forward movement of the carriage. The paper gripping mechanism is also adapted to move into a release position so that as the carriage is retracted the paper remains on the table for the next pushing operation.

As best seen in FIGURES 7 and 8, the paper gripping mechanism comprises an upper holding block 111 made of rubber or the like and adapted to grip the upper surface of the paper when a lower holding block 112 is pushed thereagainst to hold the paper in squeezing relation therebetween. The lower holding block 112 also contains a surface made of rubber or the like and has recesses or grooves 113 constructed to accommodate the rods 106. The lower holding block 112 is mounted for vertical upward movement as shown in FIGURES 7 and 8 by movement of pins 114 which are threaded into the block 112 and mounted for axial movement on a member 116 of the main frame of the machine.

In general, any controllable means for activating the gripping member in synchronized relation with the carriage movement is suitable. However, the mechanism shown in FIGURE 8 is eminently satisfactory and operates through the use of an air cylinder 117 in operative engagement with the central pin 114 so that upon application of compressed air to the cylinder through hose 118, block 112 is forced upward against the paper which in turn is held against block 111. The force in the air cylinder also acts against tension springs 119 which normally hold the lower block 112 in retracted position as shown in FIGURE 8. These springs also serve as shock absorbers. It should also be mentioned that the air cylinder is especially suitable because the power is transmitted through flexible hose 118 which allows for movement of the carriage carrying this gripping mechanism.

The paper pusher carriage 108 comprises the paper gripping mechanism 109 just described and means 121 for moving the gripping member through the long axis of the paper to advance the paper such distance. This means 121 may be any suitable means capable of performing this function, but I prefer to use an air cylinder 122 as shown, because the control of the air cylinder is easily synchronized into the control of the air cylinder of the gripping member and other components of the paper pushing mechanism. In fact, air cylinder 122 and air cylinder 117 are preferably actuated by the same valve and air supplied to both cylinders simultaneously. Cylinder 117 operates first because the comparatively large size of cylinder 122 requires more time to fill and the inertia of the carriage holds it still until sufficient air pressure builds up to cause movement.

Air cylinder 122 is a conventional two-position or double-acting air cylinder capable of moving a connecting rod 123 axially between two extreme positions, which positions are adjustable according to any known means. Thus, air hoses 124 and 125 are provided with differential air pressures to produce a differential pressure either in front of or behind a piston 130 (see FIGURE 10) carried within the cylinder to move the piston and connecting rod either in a forward or reverse direction. The other end of connecting rod 123 is connected to the upper holding block 111, frame members 120 and member 116 as shown in FIGURE 8. Movement of this upper block and frame member causes corresponding movement of the entire carriage and lower block 112.

In certain forms of control of the paper pusher, a pair of limit switches 126 and 127 are provided at each end of the stroke of the carriage to indicate completion of the forward and reverse stroke, whichever the case may be. Actuation of these switches is achieved by an arm 128 held on the member 116 of the paper gripping mechanism, as best shown in FIGURE 8. These switches are used in the preferred control embodiment shown in FIGURE 14, but are not required when the control system of FIGURE 13 is used.

The cutter 104 which cuts off the length of paper provided by movement of the carriage cooperates with the paper pusher by positively holding the end of the paper in place and preventing inadvertent retraction thereof as the carriage is moved back into the retracted position.

This cutter comprises a fixed cutting blade 129 mounted on the frame of the machine under the band of paper 101 at the position to be cut, and a moveable cutting blade 131 carried on a member 132 for relative movement with respect to cutting blade 129 so as to pass adjacent thereto and provide a shearing force to cut the paper between the blades. If desired, other means could be provided which would accurately cut the paper at a fixed position. The cutter 104 also contains the holding block 133 which is carried on member 132 in position to be forced against the top of the sheet 101 after cutting is effected upon movement of cutting blade 131. In other words, movement of member 132 first effects cutting by blade 131 and then effects holding of the paper by pushing block 133 into position.

This operation is accomplished by means capable of moving the member 132 in a vertical direction in a timed sequence so that the cutting and holding may be effected during the proper period in the cycle of operation of the paper pusher. As shown in FIGURES 6 and 7, the cutting blade 129 is carried on a member 134 which is pivoted to the frame at 136 and pivoted to member 132 at its other end by means of pin 137. In this way, the cutting blades 129 and 131 are brought together in similar fashion to the blades of a pair of shears, as member 132 is moved vertically by the operation of air cylinder 138. In this way, the position of the cutting blades and the associated holding means is positively controlled by a control of the air supply through air hoses 139 and 141.

While I have shown air cylinders for providing the movement, it will be appreciated that other means controllable by a valve or conventional control means could be substituted for the air cylinders. In the system shown, the appropriate air cylinders are connected in proper sequential relationship to a suitable source of air pressure (not shown) through valves which are programmed in proper sequence by the control system described hereinafter.

Thus, in mechanical operation of the machine here shown, it is seen that the meat patty forming section operates simultaneously with the paper supplier and that the two operations are synchronized together for proper operation in unison. In addition, it will be seen that the various operations of the patty forming section take place simultaneously with the operation of the paper supplier. In this way, the speed of operation of the machine is limited only by the length of time of the longest single operational step; the other operational steps take place within this same period. However, it will be appreciated that the patty forming apparatus and paper supplier can also be operated as entirely separate units.

Figure 10:
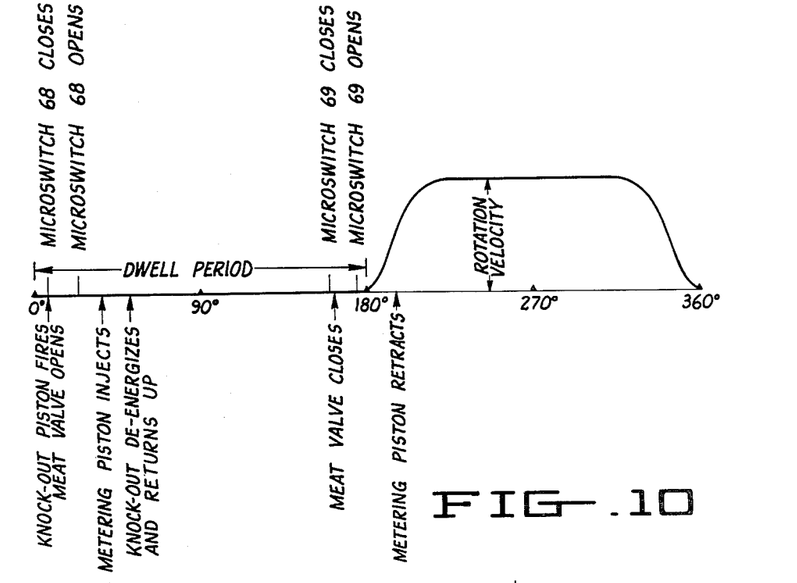
FIGURE 10, a diagrammatic view illustrating the cycle of operation of the machine of this invention.

Referring more particularly to FIGURE 10 where the cycle of operation of the patty forming section is shown schematically, it is seen that the following operations then take place. Beginning with the cessation of movement of the mold plate, it first comes to a stationary position with an opening in position at the meat forming station and the formed patty in position at the knockout station. Microswitch 68 then closes and this operates the knockout plate 42 to begin ejecting a patty at the knockout station and simultaneously causes the meat valve to open by moving plate valves 28 and 29 so as to close off the source of supply of meat into the meat receiving chamber 26 and open the communication between meat receiving chamber 26 and the mold plate at the meat forming station.

With these operations triggered by the switch through the control system, microswitch 68 now opens and the following operations take place automatically through the control system: Plunger 27 is operated to move meat from the meat receiving chamber to the mold, and a short time later the knockout cylinder is activated to return knockout unit 41 to the inactive position. Near the end of the dwell period microswitch 69 closes and this operates through the control system to close the meat valve or return plate valves 28 and 29 so as to close the meat receiving chamber from the mold area and open it to the source of supply from which meat is received at constant pressure.

A short time later the microswitch 69 opens and the flat plate rotates one-third of a revolution to the next position. During this period, the plunger 27 retracts and the meat receiving chamber is supplied with a fresh supply of meat for the next cycle. In the event that the knockout plate sticks into the substantially flat mold plate, it will be forced out on rotation of the flat plate as mentioned above and returned to its proper position.

From the foregoing description, it is seen that meat patties are molded and delivered to the conveyor 13 at a uniform rate which is one-third of a second at full motor speed for the machine herein shown. Thus, every one-third of a second, a meat patty falls through the chute and trips the trigger microswitch 96 to activate the paper pusher as the completed hamburger patty is carried away on the piece of paper previously supplied on conveyor 81. In certain cases, it is found desirable to reduce the motor speed so that the cycle time is, say, one-half second to insure sufficient meat supply to the machine.

The patties formed as explained above then trigger the microswitch 96 or resistance probes 251 which activates the paper supply mechanism to provide the next sheet of paper 97 in position prior to the arrival of the next hamburger patty. Thus, the paper pusher mechanism and control therefor is designed to go through its complete cycle in a period of time of less than one-third of a second so that this operation can be properly synchronized with the patty forming operation mentioned above.

Figure 11:
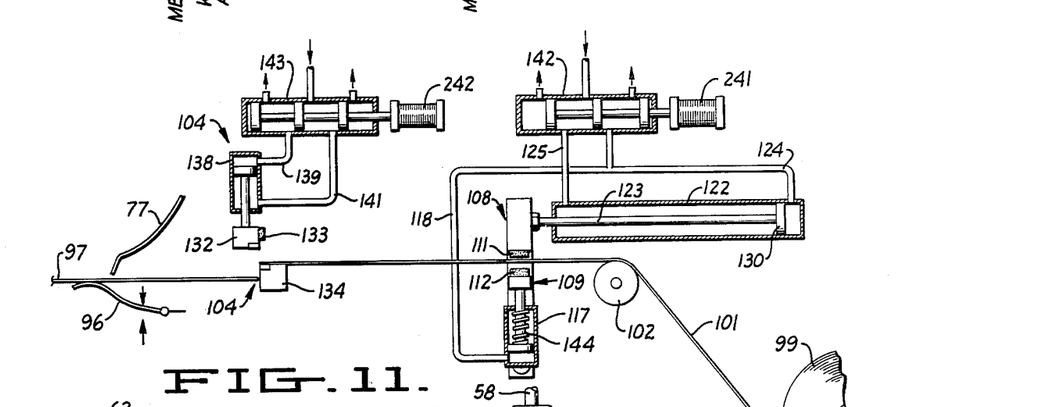
FIGURE 11, a diagrammatic view illustrating the paper pusher controls.

The operation of the various valve and actuating elements of the paper pusher when used with the control system of FIGURE 13 is shown in FIGURE 11, where all of the actuating elements are illustrated diagrammatically.

At the beginning of the cycle, the paper pusher carriage 108 is in a retracted position with air cylinder 122 also in the retracted position and capable of pushing the carriage forward through connecting rod 123. The gripping mechanism 109 is also out of contact with the paper with air cylinder 117 in the lower or retracted position. The trigger microswitch 96 is under the paper chute in the upper or normal position with a piece of cut paper 97 resting on it from the previous operation.

When the trigger microswitch is tripped, the paper pusher valve 142 is first opened to provide compressed air to the air cylinder 122 through air hose 124, and simultaneously provide compressed air to the air cylinder 117 through air hose 118 to clamp the upper and lower holding blocks 111 and 112 together. After the blocks come together, a section of paper is pushed forward by the carriage as connecting rod 123 advances to the end of the stroke. When the microswitch 96 is tripped, a signal is also sent to the knife valve 143 of the cutter 104 to bring compressed air into cylinder 138 through hose 139. This signal is sent through a delay mechanism which may be a timed delay relay or other timed component so that the valve operates after sufficient time has taken place for the paper to be pushed forward.

After the paper is cut, the cutter 104 is held in position so that rubber clamp or holding block 133 holds the forward edge of the paper as the carriage is retracted. The carriage is preferably retracted by a timed signal which is provided after the knife is positioned. The carriage returns to its retracted position by moving paper pusher valve 142 to the position shown in FIGURE 11 with the compressed air in communication with line 125. With this valve position, air cylinder 117 is depressurized and the grip released by means of the spring 144 carried within the cylinder.

In the preferred form, I now use resistance probe 251 in place of microswitch 96 and employ the limit switches 126 and 127 to actuate the control system shown in FIGURE 14. In this system, the paper pusher valve 142 is first opened by solenoid 241 operated when limit switch 127 is closed and resistance probes 251 sense the arrival of a patty. On operation of paper pusher valve 142, the carriage moves forward and pushes a section of paper as explained above. When the carriage reaches the full position, limit switch 127 is actuated and this operates knife valve 143. The complete control system contains various delays and holds together with provisions for resetting as described more fully below.

Although it will be appreciated that other systems of control may be used, I prefer to use a system in which electrical controls operate independent devices such as the fluid cylinders, because it gives especially accurate results or reliability. In addition, I also prefer to use electrical time delay mechanisms so as to minimize lag times and further increase reliability.

In order to positively insure accurate operation of both cycles, I prefer to use a control circuit which must be reset at the end of each cycle and indicates through a warning or other similar device in the event that the machine has stopped functioning. In the event of failure, the machine simply stops rather than continue with improper operation.

The various controls required may be programmed by suitable relays, if desired, and where a time delay is necessary a time delay relay may be used. These systems are quite satisfactory and suitable for performing the necessary control, but have the disadvantage of utilizing moving parts which are subject to wear. Accordingly, I prefer to use a static control system in which transistors are utilized to provide control signals for activating the various valves which in turn provide the operations described above.

Such transistorized static control units are available commercially from the General Electric Company, and a full explanation of these units is given in the General Electric Bulletin GPZ–B53B. In order to prevent confusion, the same symbols are utilized in the drawing herein as those utilized in the General Electric Bulletin for the various electric components involved. These components are easily mounted in suitable control boxes so that the entire control system for each apparatus can be kept in a compact unit in a convenient place. In addition, these units are capable of long useful lives and are not subject to mechanical failures.

Figure 12:
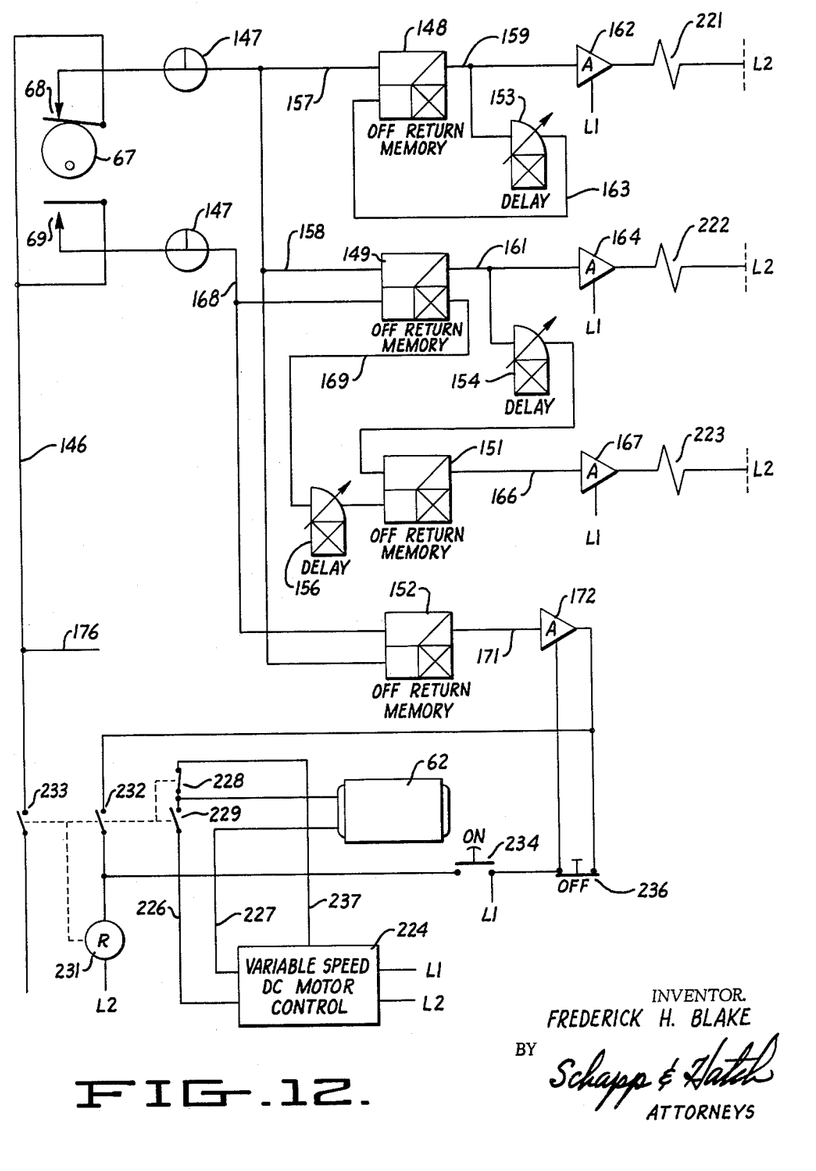
FIGURE 12, a diagrammatic view illustrating a typical control circuit that may be used in the patty forming section of this machine.

In the machine of this invention, there are two basic control circuits utilized, one being used for the patty former and the other being used for the papering device. Referring more particularly to FIGURE 12, there is shown a static control circuit for the patty former. As here shown, power is provided from a 125 volt direct current supply line 146 to the microswitches 68 and 69 which are operated by the cam 67 as indicated above. This line current is converted to a signal output by the converter units 147 so that each microswitch in effect provides a signal output. The logic units utilized in FIGURE 12 comprise off-return memory units 148, 149, 151 and 152 and delay units 153, 154 and 156.

Each off-return memory unit is adapted to provide an output signal at the upper right when the unit is "on" and adapted to provide the signal at the lower right through the "not" portion thereof when the unit is off. Input signals are provided to the left-hand side of the unit as shown with the "on" input being provided at the upper left. When the signal is provided to this "on" input, the upper right output emits the signal and this signal continues even though the input is discontinued. However, the signal on the upper right is discontinued when a signal is provided to the lower left or "off" input thereof. Each delay unit simply provides an output at the right-hand side thereof a controlled time interval after receiving an input signal from the left-hand side thereof.

Thus, it is seen that the control circuit of FIGURE 12 operates the various units in the patty former through these components. As the cam 67 activates microswitch 68 at the beginning of a cycle, the signal is provided from the direct current converter 147 to lines 157 and 158, thereby activating off-return memory units 148 and 149 to provide signals in lines 159 and 161.

The signal in line 159 is amplified in amplifier 162 to actuate a solenoid 221 controlling the supply of air into the knockout cylinder so as to knock out a patty at the meat removing station. The signal in line 159 also provides an input to time delay unit 153 which provides a signal in line 163 after the timed period to the "off" input of off-return memory 148. This shuts off the unit, returns it to its original condition, and shuts off the knockout unit. By this time, the microswitch 68 has returned to the "off" position so that unit 148 remains off until the next cycle of operation.

The signal in line 161 is amplified by amplifier 164 and this output used to actuate another solenoid 222 controlling the air pressure to the meat valve so as to move the meat valve into position in preparation for moving meat into the mold. The signal in line 161 also goes through time delay unit 154 to off-return memory unit 151 where it provides the signal in line 166 after the interval of time adjusted in delay 154. The signal in line 166 is amplified by amplifier 167 and operates a valve through solenoid 223 which in turn actuates the metering piston or plunger 27.

Near the end of the dwell period, the microswitch 69 is turned on and this provides a signal through the other converter 147 to line 168 which in turn turns off the off-return memory unit 149. This returns the meat valve to its original position. In addition, the signal in line 168 commands a signal from the "not" portion of the unit 149 in line 169 which passes through time delay unit 156 and then turns off the off-return memory unit 151. With the unit 151 turned off, the metering piston is returned to its original position. In this way, the cycle is completed and all control units are returned to their original positions for the next cycle period.

In order to provide additional assurance of proper operation, a cycle completion lock-in system is included which operates from off-return memory unit 152. As illustrated in FIGURE 12, the off-return memory unit 152 is simply turned on when microswitch 69 is turned on at the end of the dwell period and stays on by virtue of its memory characteristics until the beginning of the next dwell period when microswitch 68 is turned on. Thus, a signal is produced in line 171 which operates amplifier 172 during the period that the motor is rotating the mold and the cycle units are off. This prevents the motor from stopping during the period of movement of the plate, and stops it in position to start during the dwell period. In other words, when the "off" button is pushed while amplifier 172 is on, the line remains in communication with the motor. Then when the amplifier is turned off, the motor turns off.

In addition, with the motor stopped during the dwell period, it is also started during the dwell period. This reduces starting intertia and allows the use of a smaller motor. By using the control system of FIGURE 12, the operation of the control systems for the patty former and papering device are tied in with the motor switches so that these systems are turned on and off with the motor. Since the motor can only stop during a dwell period, completion of the patty forming cycle is assured. However, since the papering cycle needs extra operations to clear the conveyor, means are provided to continue operation for a time sufficient to accomplish this result.

Referring again to FIGURE 12, the lines $L_1$ and $L_2$ are A.C. lines with $L_1$ being neutral. Thus, it is seen that solenoids 221, 222 and 223 and the variable speed D.C. motor control units 224 operate from a conventional A.C. line source. Lines 226 and 227 from unit 224 are the positive and negative lines, respectively, of a controlled D.C. output used for driving motor 62. The motor is switched between an "on" position and a dynamic braking "off" position by operation of normally closed relay switch 228 and normally open relay switch 229 with relay solenoid 231 which also controls normally open relay switch 232 and normally open relay switch 233. Relay switches 228, 229, 232 and 233 are all tied together for common operation.

In operation, normally open push button "on" switch 234 is depressed to close the circuit to solenoid 231. This solenoid is then locked in through relay 232 and holds relay 233 closed, relay 229 closed and relay 228 open. The D.C. motor is now on and direct current is also provided in lines 146 and 176. When the normally closed "off" button 236 is depressed and cycle lock-in amplifier 172 is off, solenoid 231 is deactivated and relays 228, 229, 232 and 233 return to their normal positions. Relay 228 puts a load (not shown) on motor 62 through line 237 to provide dynamic braking with the motor acting as a generator. Lines 146 and 176 are also shut off.

The papering device may also be controlled by a variety of different control units such as the conventional relay system. When relays are used, the forward and back limit switches actuated by the carriage are utilized for actuating relays, which in turn operate the air valves at the proper time. However, by utilizing a static control system such as my preferred limit switch static control circuit shown in FIGURE 14, the advantages of a fail-safe mechanism, minimum time lags, and reliability are obtained.

A typical static control system which may be used is shown in FIGURE 13. As there shown, the power line for the control is line 173 and this is closed by power relay 174 to provide a current source to the trigger microswitch 96. In order to tie the operation of the papering device into the patty control, the initiating signals for this relay must be received from the cycle control through line 176. However, once actuated, means is provided for retaining the power relay in operation to complete the cycle.

The initiation is accomplished by a signal in line 177 which is obtained from the converter 178 from the cycle relay at a convenient place in the cycle control. This signal 177 then turns on the hold memory unit 179 to provide a signal in line 181. The signal in line 181 then provides an output in line 182 through OR 183. The OR is a component described in the General Electric Bulletin cited above which is capable of producing an input signal when any of the input signals are activated.

Returning again to the signal 177, it is seen that when this signal ceases because the motor is turned off, there is no command signal to the NOT component 184. This provides an output signal in line 186 because there is not an input signal in line 185. Thus, when the signal in line 177 ceases, a signal is provided in line 186 which passes through the time delay unit 187 to line 188 where it turns off the off-return memory unit 179. By this time, however, the patties on the conveyor have all been papered because the delay 187 is adjusted to allow this. If the signal shuts off the off-return memory during a cycle, the power relay is held by a signal from line 189 which actuates the output of OR 183. It will also be noted that the power hold memory system is returned to its original condition for the next operation.

With power available through line 173, power is provided when switch 96 is actuated through converter 191 to line 192. It will be noted that the static controls used in this circuitry include an AND 193 together with a pair of sealed ANDS and three time delay units equipped with NOT portions. The ANDS simply provide an output when all of the inputs are provided with signals and the output ceases when any one of the inputs cease. With the sealed AND, the operation is similar to the regular AND except that one of these inputs is sealed to the output. Accordingly, interruption of that input has no effect because the output provides an input automatically to that input section. Therefore, the AND must be shut off by interrupting the signal of one of the other inputs. The time delay is similar to that mentioned above; that is, it provides an output at a timed interval after the input. The NOT portions of the time delay function are similar to the NOTS already mentioned in that they do not provide an output when an input is provided, but they do provide an output when an input is not provided.

Thus, referring back to the line 192 in which a signal has been provided, it is seen that one of the inputs to AND 193 now has a signal. It will also be seen that input 194 was already provided by a signal by virtue of the condition prior to the turning on of the microswitch. In other words, prior to the time a signal is provided in line 192, there is no input signal to the NOT 196, and this condition gives rise to the signal in line 197, which in turn provides an input to off return memory 198 and a signal in line 194. When the switch 96 was turned on, this provided an input to NOT 196 which in turn removed the input to the off return memory 198; however, being a memory unit, the signal continues in line 194.

With the signal in output line 199 from AND 193, it is seen that the sealed input of sealed ANDS 201 and 202 (which are conventional components with three inputs) are now provided with signals. It is also seen that the other two inputs of sealed AND 201 are provided with a signal through line 203 from the NOT portion of time delay 204. Similarly, the other two inputs of sealed AND 202 receive input signals through line 206 from the NOT portion of time delay unit 207. In this way, signals are provided in lines 208 and 209 when the microswitch 96 is turned on and AND 193 functions. Since both of these ANDS are sealed, they will continue to function even though AND 193 is shut off. In other words, sealed ANDS 201 and 202 remain on until the signals in lines 203 and 206 cease by virtue of inputs to the time delay carrying the NOT portions utilized.

Thus, the signal in line 208 operates through amplifier 211 to actuate solenoid 241 and operate the paper pusher valve 142 (see FIGURE 11). With this operation, the paper is gripped with rubber clamps 111 and 112 and the carriage is pushed forward to provide a length of paper for a new sheet.

The signal in line 209 passes through time delay 212 which is set for a sufficient length of time to allow the carriage to reach its full stroke, and then its output in line 213 is amplified in amplifier 214 to actuate solenoid 242 and operate the knife valve 143. Signal 209 also provides a signal in line 189 to retain power relay 174 through OR 183 as indicated above. Signal 213 not only operates the knife valve, but it also provides a signal to a time delay 204 and a signal back to the off input of the reset memory 198.

Considering the effect of turning off the reset memory 198 first, it is seen that this turns off the input 194 to AND 193 and positively prevents operation of the AND 193 until a new signal is received from the NOT 196. This positively prevents the operation of another cycle in the event that the microswitch should stick for some unforeseeable cause. In this way, another fail-safe device is provided to prevent partial operation of the unit which in this case would result in stacking up unwanted pieces of paper.

Now considering the effect of the signal in line 213 activating time delay 204, it is seen that this turns off the signal in line 203 by deactivating the NOT output and this shuts off the sealed AND 201. This returns the paper pusher valve 142 to its normal position, returns the stroke of the carriage and allows the spring return of the gripper cylinder to open the gripper prior to the return of the carriage. The time delay output of time delay 204 in line 216 then provides an input to time delay 207 which shuts off the signal through the NOT portion thereof in line 206 which in turn shuts off sealed AND 202.

With sealed AND 202 shut off, the knife valve 143 is returned to the opened position in preparation for a new cycle. This also shuts off the signal 209 and those which followed into the time delay units carrying the NOTS so as to provide a signal back into the NOT portions thereof so as to prepare sealed ANDS 201 and 202 for the next cycle. In this way, the paper pusher carries out cycles of operation in synchronized fashion with the patty former so that it cuts sheets of paper as they are provided under each patty.

As mentioned above, the preferred static control system is shown in FIGURE 14, and this control circuit is believed to give the most satisfactory results. As there shown, the direct current line used for the control is line 173 and this is closed by power relay 174 to provide a current source to the carriage position limit switches 126 and 127. In order to tie the operation of the papering device into the patty control, the initiating signals for relay 174 must be received from the cycle control through line 176. The circuitry between line 176 and relay amplifier 174 is similar to that shown in FIGURE 13 except that OR 183 is omitted because it is unnecessary. Accordingly, the operation of this circuit will not be repeated since it is adequately described in connection with FIGURE 13 above.

With power available through line 173, power is supplied through switches 126 and 127 and the associated control circuitry to solenoids 241 and 242, respectively. It will also be noted that the static controls used in the circuitry include a resistance sensitive unit 252 which supplies an output at 253 whenever the resistance between the resistance sensitive probes 251 drops below a given value. The unit here shown is designed to function when the resistance drops below about 50,000 ohms. With this setting, the unit operates quite satisfactorily because when the resistance sensitive probes contact a meat patty, the resistance between them is in the neighborhood of between 10,000 to 25,000 ohms or well within the operating range of the unit. The signals from this resistance sensitive unit 252 go through line 253 to a signal amplifier 254. The signal amplifier 254 is a special unit which not only amplifies the signal output in line 256 but also maintains the signal for 10 to 15 milliseconds regardless of the consistency of the input. This prevents any malfunction due to probe bounce on the surface of a meat patty. The signal amplifier having these characteristics is also available from General Electric Company and shown in the bulletin cited above.

Returning again to the static circuitry, it is seen that the components described above in connection with FIGURES 12 and 13 and available from General Electric Company are again used in the manner shown. Thus, the three input AND 257 operates solenoid 241 when all three inputs receive the signal. Thus, at the beginning of the cycle, the carriage is back and switch 127 is closed. This provides a signal from line 173 through converter 258 to line 259. Line 259 has a branch 261 which provides a signal to one of the inputs of the three input AND 257.

When a patty arrives at the resistance probes 251, a signal is provided in line 256 as explained above and this signal provides operation of another input through line 262 as well as operating the NOT 263 through line 264. The NOT unit does not provide an output when an input is provided, but it does provide an output when an input is not provided. Accordingly, this signal assures that there is not a signal in line 266 at this time. However, it will be appreciated that prior to the arrival of the hamburger patty, there was a signal in line 266 by virtue of the fact that there was not an input coming from line 264. Thus, the signal from NOT 263 had activated the off-return memory 267 so that a signal was already provided in output line 268 to the other input of AND 257. The change of condition in line 266 from the provision of an input signal to the removal of the input signal does not affect the output signal 268 because unit 267 is a memory unit and will continue to provide an output until it is reset by the input in the lower left-hand corner.

Thus, with the three inputs activated at AND 257, a signal is supplied in line 269 to off-return memory 271. This and the other off-return memories supply an output signal at the upper right when upper left connection is momentarily pulsed or continuously held with a signal. The output signal is turned off if the lower left-hand input is momentarily pulsed or continuously held with the signal. Thus, the signal in line 269 turns on the off-return memory so that a signal is provided in line 272 which in turn functions through amplifier 211 to operate the solenoid 241. The signal in line 272 also goes through branch line 273 to the off-return memory 267, thereby resetting it for the next operation. This unit must be reset in order to operate on the next signal at the input from line 266, and thus the unit provides another fail-safe system.

When the solenoid 241 is activated, the carriage moves out as explained above to push a length of paper, and it should be noted that as the carriage leaves the back position, limit switch 127 opens and AND 257 shuts off since one of its inputs is now shut off. However, off-return memory 271, being a memory unit, stays in the "on" condition.

When the carriage reaches its forward position, limit switch 126 is closed, supplying an "on" signal from line 173 through converter 274 and line 276 to off-return memory 277. This in turn provides an output in line 278 which operates amplifier 214 and solenoid 242. The operation of the solenoid, in turn, operates the knife valve 143 as explained above. This cuts off the paper and clamps the sheet in preparation for the return stroke of the carriage. As explained above, the carriage is spring loaded so that it will return automatically when solenoid 241 is deactivated and the associated valve is returned. Thus, the return of the carriage is effected by shutting off the off-return memory 271.

Returning again to the output of off-return memory 277, it is seen that the signal in line 278 also operates the input of delay 279 by activating its input through line 281. The delay provides an output at a timed interval after the input and in the case of the unit used, this interval is adjustable. Thus, a signal is provided in line 282 at a timed period after the carriage reaches its extreme position, and this signal then turns off the off-return memory 271 which in turn turns off solenoid 241. The timed interval is adjusted in order to assure that the knife has had time to make its cut and the grippers are in position before the carriage is returned.

With the knife valve actuated and delay 279 timed out, the carriage returns to the back or initial position and closes limit switch 218. This again provides a signal in line 259 which turns off the off-return memory 277, thereby deactivating the knife valve and raising the knife to unclamp the paper for the next cycle. The signal in line 259 also re-supplies the AND 257 with an input signal, showing the carriages in the back position and ready for the next cycle.

Considering the effect of turning off the off-return memory 267, it is seen that this turns off the input signal in line 268 to AND 257 and positively prevents operation of the AND until a new signal is received from the NOT 263. This positively prevents the operation of another cycle in the event that the probe should be fouled for some unforeseeable cause and an output is maintained from resistance sensitive element 251. Thus, another fail-safe device is provided to prevent partial operation of the unit which in this case would result in stacking up unwanted pieces of paper or to cause a fouling of the paper delivery chute.

In this way, the paper pusher carriage carries out cycles of operation in synchronized fashion with the knife so that properly cut sheets of paper are available under each patty. The papering device can be operated as a part of the patty former unit and integral with it, as shown in the drawings, or it can be operated as a separate device, so that it can be used on any type of patty former. The following variations can be employed using the same basic principles of operation. The resistance probe or a limit switch operating the papering device can be mounted as shown whereby it is tripped by a patty leaving the cuber and resting on paper, to supply the sheet of paper for the next or following patty coming down the line, as shown in the drawings. Alternatively, it can be placed sufficiently ahead of the papering station so that the patty trips the papering device sufficiently early to supply its own piece of paper. In this way, as the patty approaches the papering station, a piece of paper will be out, cut and waiting for the patty. This is the normal operation if the papering device is used as an entirely separate device and not mounted at the outfall of the cuber on the patty former, as shown in the drawings.

Figure 9:
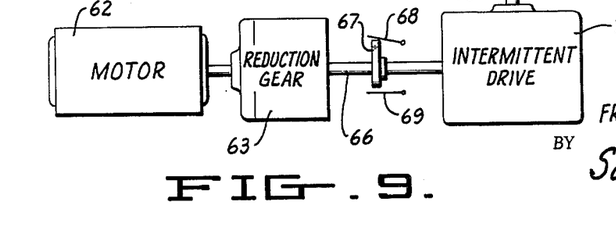
FIGURE 9, a diagrammatic view illustrating the drive system for the patty former.

It should also be noted from FIGURE 9 that the gripper is operated from airline 124 which also connects to the paper pusher "out" side of air cylinder 122 and that it is spring returned or released. Thus, the gripper is not clamping when the carriage is "back" waiting for the next cycle to begin. This raises the possibility of trouble in the pulling back of the paper strip when a "dancer" or idler roll (not shown) is used. "Dancers" are used normally to make paper unwind more easily and without jerking extra paper off the roll. It is standard practice in uncoiling a material such as paper in the control of the acceleration and deceleration of the heavy roll to use "dancers." When so used, the spring loaded "dancer" roll, in returning to its normal position after the paper has stopped feeding, will pull back paper out of the carriage. To prevent this "pull-back" and its resultant "short" sheets of paper being cut, it is better practice to connect the gripper airline (now shown connected to 124) to line 141 on the knife. Then when the carriage goes back and knife valve solenoid 242 is deenergized, the gripper on the carriage will immediately reclamp the strip and prevent it from being pulled back by the "dancer" movement.

The limit switches 126 and 127 can be either regular microswitches or can be magnetic reed switches, with a magnet being used at 128 instead of a striker plate as shown. Magnetic reed switches are small, encapsulated for water-tightness, and give extremely long life.

From the foregoing description, it is seen that I have provided a completely automated machine capable of producing uniform meat patties in both shape and weight rapidly and efficiently. It is also seen that the machine conducts its operations simultaneously and in a way that all of the operations are cooperatively related to each other so as to provide exceptional speed, yet means are provided in the machine for preventing operation of part of the machine if any malfunction should occur in any part thereof. In this way, if anything goes wrong the machine stops automatically and it is easily reset for continued operation.

I claim:

1. A machine for forming shaped articles of meat and the like, comprising a mold containing walls defining a mold cavity, means for providing the mold cavity at a meat forming station, means for supplying meat to the mold cavity at the meat forming station, and means for conveying formed meat away from the meat forming station; said means for supplying meat to the mold cavity also containing a manifold in communication with a source of meat supply and the mold cavity at the meat forming station, a pair of plate valves positioned in the manifold at spaced locations, a meat receiving chamber in communication with a manifold between the positions occupied by the two plate valves, and means for varying the volume of said meat receiving chamber.

2. The machine defined in claim 1, in which the plate valves are ganged together so that one valve is in the closed position and one valve is in the open position and opening of one valve effects closing of the other.

3. The machine for forming shaped articles of meat and the like defined in claim 2, in which a spacer plate is provided between the mold and said manifold whereby the volume of the mold cavities may be varied within certain desired limits without changing the position of the manifolds by utilizing a matching size of spacer plate in combination with said mold cavity.

4. A machine for forming shaped articles of meat and the like, comprising a mold having a plurality of cavities for forming the meat product into a desired shape, means for moving the mold cavities sequentially through a meat forming station and a meat removing station, means for supplying meat to a mold cavity at the meat forming station, a knockout mechanism at the meat removing station for removing formed meat from the cavities, a conveyor for receiving shaped meat from said station and carrying it to a papering station, control means for synchronizing the movement of the mold between the stations and the operation of the meat supplying means and the knockout mechanism; said means for supplying meat to the mold cavity including a source of meat supply under substantially constant pressure and a manifold between said source of meat supply and the mold cavity at the meat forming station, a pair of plate valves at spaced locations in said manifold, said plate valves being ganged together to move from a pair of positions, one of said positions containing one valve in the closed position with the other valve in the open position while the other of said positions contains one valve in the open position with the other valve in the closed position, a meat receiving chamber in communication with the manifold between the position occupied by the two plate valves, and means for varying the volume of said meat receiving chamber.

5. A machine for forming shaped articles of meat and the like, comprising a mold plate having a plurality of cavities for forming the meat product into a desired shape, means for moving the mold plate sequentially through a meat forming station and a meat delivery station, meat supplying means for supplying meat to a mold cavity at the meat forming station, said meat supplying means including a source of meat supply under substantially constant pressure and a manifold between said source of meat supply in the mold cavity at the meat forming station, a pair of plate valves at spaced locations in said manifold, said plate valves being ganged together so that one valve is in the closed position while the other valve is in the open position and opening of one valve effects closing of the other, a meat receiving chamber in communication with the manifold between the positions occupied by the two plate valves, controlled means for varying the volume of said meat receiving chamber whereby the meat delivered into each mold cavity is metered by said chamber, a knockout mechanism at the delivery station for removing formed meat therefrom, a conveyor for receiving meat from said delivery station and carrying it to a papering station, and control means for synchronizing the movement of the mold between the stations and the operation of the meat supplying means and the knockout mechanism, said knockout mechanism being mounted for axial movement into and out of the mold cavities for positively knocking shaped meat out of said mold cavities at said meat removing station.

6. The machine for forming shaped articles of meat and the like defined in claim 5, in which three fluid driven power means in the form of fluid pressure cylinders are provided for actuating the plate valves, the means for varying the volume of the meat receiving chamber, and the knockout mechanism, said fluid driven power means being controlled in synchronized fashion by an electric circuit system programmed to provide a fixed sequence of operation in accurately timed relation.

7. The machine for forming shaped articles of meat and the like defined in claim 6, in which the electrical circuit means contains a lock-on circuit which holds the machine in an "on" position during the movements of the parts and positively assures shut-off at a dwell position for all of the components.

References Cited by the Examiner

UNITED STATES PATENTS

| | | | |
|---|---|---|---|
| 609,728 | 8/1898 | Bolinski | 222—453 XR |
| 2,683,283 | 7/1954 | Anderson | 17—32 |
| 2,795,816 | 6/1957 | Spang et al. | 17—32 |
| 2,799,044 | 7/1957 | Mahan | 17—32 |

SAMUEL KOREN, *Primary Examiner.*

LUCIE H. LAUDENSLAGER, *Assistant Examiner.*